(12) United States Patent
Uematsu et al.

(10) Patent No.: US 8,501,365 B2
(45) Date of Patent: Aug. 6, 2013

(54) SOLID ELECTROLYTE FUEL CELL STACK

(75) Inventors: Hideki Uematsu, Kounan (JP); Masahiro Shibata, Niwa-gun (JP); Hiroshi Sumi, Ichinomiya (JP); Hiroya Ishikawa, Aichi-gun (JP); Keizo Furusaki, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 1285 days.

(21) Appl. No.: 12/159,284

(22) PCT Filed: May 24, 2007

(86) PCT No.: PCT/JP2007/060638
§ 371 (c)(1),
(2), (4) Date: Jun. 26, 2008

(87) PCT Pub. No.: WO2007/138984
PCT Pub. Date: Dec. 6, 2007

(65) Prior Publication Data
US 2010/0055525 A1    Mar. 4, 2010

(30) Foreign Application Priority Data

May 29, 2006    (JP) .................................. 2006-148792

(51) Int. Cl.
*H01M 8/10*    (2006.01)
(52) U.S. Cl.
USPC .......................................... 429/480; 429/512
(58) Field of Classification Search
USPC .................... 429/480, 456, 512, 475
See application file for complete search history.

(56) References Cited

U.S. PATENT DOCUMENTS

| | | | | |
|---|---|---|---|---|
| 5,330,858 A | * | 7/1994 | Shundou et al. | 429/436 |
| 6,835,486 B2 | * | 12/2004 | Prediger et al. | 429/433 |
| 2002/0127453 A1 | | 9/2002 | Kitagawa et al. | |
| 2003/0203265 A1 | | 10/2003 | Chen et al. | |
| 2004/0072063 A1 | * | 4/2004 | Wyser | 429/94 |
| 2004/0106033 A1 | | 6/2004 | Kato et al. | |
| 2011/0020725 A1 | * | 1/2011 | Brantley et al. | 429/457 |

FOREIGN PATENT DOCUMENTS

| | | |
|---|---|---|
| JP | 6-349506 A | 12/1994 |
| JP | 8-273691 A | 10/1996 |
| JP | 2002-184448 A | 6/2002 |
| JP | 2002-270212 A | 9/2002 |
| JP | 2002-313370 A | 10/2002 |
| JP | 2004-022343 A | 1/2004 |
| JP | 2004-171967 A | 6/2004 |
| JP | 2005-174884 A | 6/2005 |

OTHER PUBLICATIONS

Japanese Office Action issued on Nov. 13, 2012 in Japanese Application No. 2008-517889.
Canadian Office Action issued on Sep. 20, 2012 in Canadian Application No. 2,648,655.

* cited by examiner

*Primary Examiner* — Mark F Huff
*Assistant Examiner* — Monique Wills
(74) *Attorney, Agent, or Firm* — Sughrue Mion, PLLC

(57) ABSTRACT

A solid electrolyte fuel cell comprises a solid electrolyte body having a fuel electrode contacting a fuel gas and an air electrode contacting air. A plurality of the solid electrolyte fuel cells are stacked to form a solid electrolyte fuel cell stack, in which the stacked body of the solid electrolyte fuel cells is pressed in the stacked direction and fixed by a fixing member inserted into a through-hole passing through the stacked body in the stacked direction. Inside the through-hole, there is equipped an inner gas channel for supplying the gas to the solid electrolyte fuel cell side or evacuating the gas from the solid electrolyte fuel cell side.

18 Claims, 11 Drawing Sheets

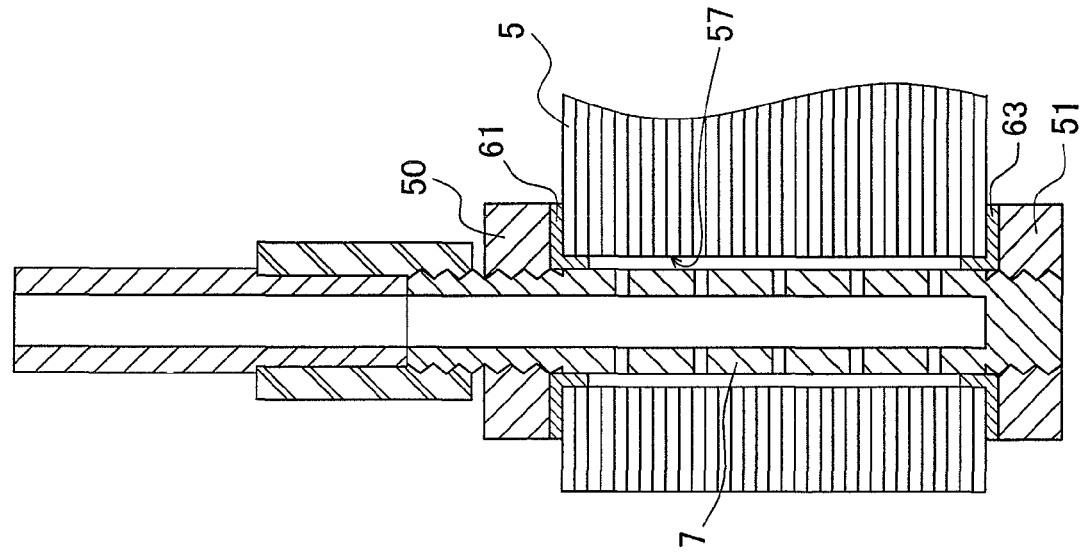
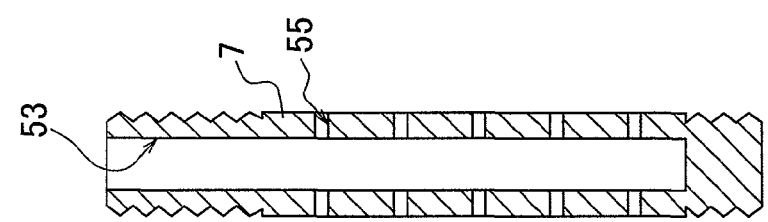
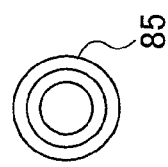
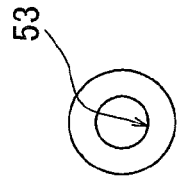
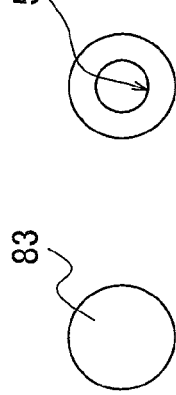
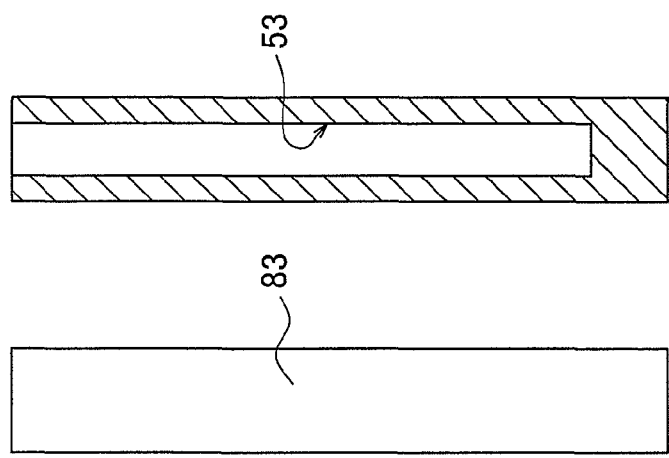

SOLID ELECTROLYTE FUEL CELL STACK

TECHNICAL FIELD

The present invention relates to a solid electrolyte fuel cell stack wherein a plurality of solid electrolyte fuel cells, including a solid electrolyte having a fuel electrode and an air electrode, is stacked.

BACKGROUND ART

As a fuel cell, a Solid Oxide Fuel Cell (to be also referred to as SOFC), in which a solid electrolyte (solid oxide) is used, is conventionally known.

The SOFC is configured such that a number of fuel cells, having a fuel electrode and an air electrode on each surface of a solid electrolyte formed in, for example, a plate shape, is disposed so as to form a stack. The SOFC generates electricity by supplying fuel gas to the fuel electrodes, supplying air to the air electrodes, and causing a chemical reaction via the solid electrolyte between the fuel and oxygen contained in the supplied air.

For the above-described SOFC, the suitable operation temperature was previously thought to be approximately 1000° C. However, since a development has been recently made with regard to a solid electrolyte material having a low resistance, and to a type of a support membrane that enables to thinly form a solid electrolyte, the suitable operation temperature has been decreased to approximately 750° C., in which a metallic material can be used.

That is, a metallic material can be used for constituting members, except for a solid electrolyte, such as for a frame that supports a solid electrolyte, for constituting members that form a gas flow path, for an interconnector (a constituting member that obtains conduction between cells inside of a stack), and so on. By using a metallic material, having a good processing ability and a high strength, for such constituting members, highly reliable SOFCs have been able to be developed.

One common type of SOFC, in which the above-described metallic frame and the metallic interconnector are used, is a SOFC wherein plate-shaped single cells are stacked interposing interconnectors therebetween, and connected to bolts and nuts so as to form a stack (see Patent Document 1).

Moreover, an internal manifold type of SOFC has been developed wherein each of frames is provided with holes to be used as a gas flow path (a gas flow path for inflow and outflow of fuel or air), and the frames are stacked in a number of layers so as to form a gas manifold (see Patent Document 2).

Furthermore, an apparatus has been proposed wherein a gas flow path is provided at four corners of frames so as to penetrate a stack, and gas is supplied to each cell (see Patent Document 3).

Patent Document 1: Unexamined Japanese Patent Publication No. 2005-174884
Patent Document 2: Unexamined Japanese Patent Publication No. 6-349506
Patent Document 3: Unexamined Japanese Patent Publication No. 8-273691

DISCLOSURE OF THE INVENTION

Problems to be Solved by the Invention

In the technique according to Patent Document 1, joint holes for inserting bolts into frames have to be provided in addition to the gas flow path. Therefore, there have been some drawbacks in developing a highly efficient fuel cell having a high volume energy density.

In other words, since holes for inserting bolts are needed in addition to the gas flow path, there has been a problem in that a planar surface of the frames has be enlarged, which consequently produces an unnecessary portion that does not contribute to electric power generation, and decreases the volume energy density. Additionally, there has been a problem in that, since the rate of metallic materials used in the SOFC stack increases due to the enlargement in the frame size, the weight energy density is also decreased.

In the technique according to Patent Document 2, since frames provided with holes used for the gas flow path are stacked, the frames need to be pressed in the stacking direction by an additional restraining device, in which bolts and the like are used, in order to reliably seal the stacked portions of the frames in a gas tight manner. Consequently there has been a problem in that the structure of the stack becomes complicated, and the above-described energy density becomes decreased.

Furthermore, in the technique according to Patent Document 3, although pipes to be used as the gas flow path are disposed at the four corners of frames, the frames need to be pressed in the stacking direction by an additional restraining device, in which bolts and the like are used, as well as in the above-described Patent Document 2. As a result, there has been a problem in that the structure of the stack becomes complicated, and the above-described energy density becomes decreased.

The present invention is made in order to solve the above-described problems. The purpose of the present invention is to provide a solid electrolyte fuel cell stack in which the structure thereof can be simplified as compared to a conventional structure, and the energy density can be improved.

Means for Solving the Problem (1) In a first aspect of the present invention, a solid electrolyte fuel cell stack includes a plurality of solid electrolyte fuel cells stacked therein, a plurality of through holes, a plurality of press-fixing portions, and a gas flow path. Each of the plurality of solid electrolyte fuel cells includes a solid electrolyte having a fuel electrode, which contacts with fuel gas, and an air electrode, which contacts with oxidant gas. The plurality of through holes penetrates a stacked body, formed by the plurality of solid electrolyte fuel cells, in a stacking direction. Each of the plurality of press-fixing portions includes a fixing member inserted in one of the plurality of through holes, and presses the stacked body in the stacking direction so as to secure the stacked body. The gas flow path is provided inside of the plurality of through holes, in each of which the fixing member is disposed, so as to either supply gas toward the plurality of solid electrolyte fuel cells, or discharge gas from the plurality of solid electrolyte fuel cells.

In this aspect of the present invention, the gas flow path is provided inside of the plurality of through holes, in each of which the fixing member is disposed, so as to supply gas toward the plurality of the solid electrolyte fuel cells, or to discharge gas from the plurality of the solid electrolyte fuel cells. A space provided inside of the fixing member, and a space between an outer surface of the fixing member and the stacked body, for example, are used as the gas flow path.

In such configuration, unlike in conventional techniques, extra through holes, penetrating a stack in a stacking direction, do not have to be provided in addition to the gas flow path, or additional fixing members, such as bolt and the like, for restraining the stack do not have to be provided. Therefore, a planar size of cells can be small, and the structure of the cells can be simplified. As a result, volume energy density, and, consequently, weight energy density can be increased.

Generally, a plurality of through holes is formed and the fixing members are inserted therein. However, not all of the plurality of through holes, in each of which the fixing member is inserted, has to be used as the gas flow path, as long as each gas flow path is secured.

Each of the plurality of solid electrolyte fuel cells mentioned here has a structure (a cell body) constituted with the fuel electrode, the air electrode, and the solid electrolyte, and is an electric generation unit that generates electricity by contacting with gas.

(2) In a second aspect of the present invention, the gas flow path is constituted with the fixing member.

In this aspect of the present invention, one portion or an entire portion of the gas flow path can be formed by, for example, providing a space inside of the fixing member, and proving grooves on an outer peripheral surface of the fixing member.

(3) In a third aspect of the present invention, the fixing member is provided, inside thereof, with the gas flow path.

The fixing member in the present invention is provided, inside thereof, with a gas flow path (an internal gas flow path) in the same manner as in, for example, a hollow bolt. By using such fixing member, the stacked body of the plurality of solid electrolyte fuel cells can be pressed and secured, and a gas flow path (an internal manifold), communicating with the plurality of solid electrolyte fuel cells, can be easily achieved.

(4) In a fourth aspect of the present invention, the gas flow path, provided inside of the fixing member, includes a gas flow path that communicates inside of each of the plurality of through holes and outside of the stacked body.

In this aspect of the present invention, inside of each of the plurality of through holes and outside of the stacked body can be communicated by using such fixing member.

(5) In a fifth aspect of the present invention, a space, communicating with the gas flow path, provided inside of the fixing member, is provided between the fixing member and the stacked body.

For example, gas supplied from the gas flow path inside of the fixing member is supplied to each of the plurality of solid electrolyte fuel cells. In this case, if a space is provided in an outer peripheral side of the fixing member such that the space and the gas flow path of each of the plurality of solid electrolyte fuel cells are communicated, gas can be easily supplied toward the cells (thorough the space), irrespective of position of opening portions provided in the outer peripheral side of the fixing member. The same applies with regard to discharging gas.

A preferable space used for the above-described space may be formed (for example, in a cylindrical space, such as a circular cylindrical space) by the outer peripheral surface of the fixing member and the inner peripheral surface of each of the plurality of through holes, wherein the inner diameter of the plurality of through holes is determined to be larger than the outer diameter of the fixing member by a predetermined size or more.

(6) In a sixth aspect of the present invention, the fixing member is a long member. Moreover, the gas flow path, provided inside of the fixing member, includes an axial gas flow path extending in a longitudinal direction of the fixing member, and lateral holes communicating with the axial gas flow path and opened toward an outer periphery of the fixing member.

This aspect of the present invention gives an example of a preferable configuration of the fixing member.

(7) In a seventh aspect of the present invention, the fixing member is a hollow bolt.

This aspect of the present invention gives an example of the fixing member. In other words, if a hollow bolt is used, the space inside of the hollow bolt may be used as a gas flow path.

(8) In an eighth aspect of the present invention, grooves that communicate inside of each of the plurality of through holes and outside of the stacked body are provided on an outer peripheral surface of the fixing member.

In this aspect of the present invention, since grooves that serve as a gas flow path are disposed outside (on the outer peripheral surface) of the fixing member, instead of inside of the fixing member, a gas flow path can be easily formed.

In other words, inside of each of the plurality of through holes (for example, the space formed by the outer peripheral surface of the fixing member and the inner peripheral surface of each of the plurality of through holes) and outside of the stacked body (for example, a nut, a pipe, and so on connected so as to be communicated with each of the plurality of the through holes) can be communicated by these grooves.

By forming grooves in a longitudinal direction of, for example, a bolt and the like up to an end portion of the bolt, and communicating the end portions of the grooves with a pipe and the like, which is connected to one of the plurality of through holes, a gas flow path, extending inside of the pipe through the grooves up to inside of one of the plurality of through holes, can be formed.

(9) In a ninth aspect of the present invention, a communication hole that communicates inside of each of the plurality of through holes and outside of the stacked body is provided inside of a member (for example, a nut) with which the fixing member (for example, a bolt) is engaged.

This aspect of the present invention gives an example of forming a gas flow path. If, for example, the communication hole is disposed so as to penetrate the nut, the communication hole may be provided, for example, such that inside of a pipe, connected to one of the plurality of through holes (in which the fixing member is inserted), and the space, formed in the outer peripheral surface side of the fixing member, are communicated.

(10) In a tenth aspect of the present invention, a groove that communicates inside of each of the plurality of through holes and outside of the stacked body is provided on an inner peripheral surface of a member (for example, a nut) with which the fixing member (for example, a bolt) is engaged.

This aspect of the present invention gives an example of forming a gas flow path. If, for example, the groove is disposed on the inner peripheral surface of the nut, the groove may be provided, for example, such that inside of a pipe, connected to one of the plurality of through holes (in which the fixing member is inserted), and the space, formed in the outer peripheral surface side of the fixing member, are communicated.

(11) In an eleventh aspect of the present invention, a cylinder externally fitted with the fixing member is disposed inside of each of the plurality of through holes. Moreover, a gas flow path is provided inside and outside of the cylinder. Furthermore, the cylinder is provided with communication holes that communicate the gas flow path inside and outside of the cylinder.

By disposing the cylinder (having the communication holes) outside of the fixing member, a state of gas inflow and gas outflow can be adjusted. For example, when gas flows into the plurality of through holes, gas hardly reaches to a leading end side (in an inflow direction). However, if, for example, a number of communication holes are disposed in the leading end side of the cylinder, gas can be evenly supplied.

(12) In a twelfth aspect of the present invention, the fixing member is a long member in which a plurality of members is connected in an axial direction.

In a case wherein the fixing member is short, a plurality of members may be connected in the axial direction by using, for example, a mating structure of screws, so that a necessary length can be obtained.

(13) In a thirteenth aspect of the present invention, each of the plurality of press-fixing portions further includes an engagement member which engages with the fixing member.

This aspect of the present invention gives an example of the press-fixing portions. If, for example, the fixing member is a bolt, a nut may be used as the engagement member. Therefore, the bolt and the nut can be fastened so that the stacked body is pressed and secured.

(14) In a fourteenth aspect of the present invention, each of the plurality of solid electrolyte fuel cells includes a frame portion that encloses a cell body, including the fuel electrode, the air electrode, and the solid electrolyte, from an outer peripheral side of the cell body in a planar direction thereof. Moreover, the fixing member penetrates the frame portion.

This aspect of the present invention gives an example of a structure wherein the fixing member penetrates the frame portion disposed in the outer periphery of each of the plurality of solid electrolyte fuel cells.

The frame portion is constituted with a plurality of frames (metallic frames, insulating frames, and so on) disposed in a stacked manner. If there is no frame portion, through holes may be disposed in the outer peripheral side of the cell body and the like, and the fixing member may be disposed into the through holes.

(15) In a fifteenth aspect of the present invention, a degree of thermal expansion of the fixing member is smaller than a degree of thermal expansion of the stacked body pressed by the fixing member.

In a case, for example, wherein the thermal expansion coefficient of the fixing member is smaller than the thermal expansion coefficient of the stacked body, a degree of expansion of the fixing member is smaller than the degree of expansion of the stacked body, even when the temperature of the solid electrolyte fuel cell stack increases to a high temperature. Therefore, there is an effect in that pressing force hardly becomes reduced.

The degree of thermal expansion may be measured by a difference in the size which is caused by thermal expansion.

(16) In a sixteenth aspect of the present invention, an insulating member that insulates conduction between the fixing member and the stacked body is disposed between the fixing member and the stacked body.

Due to this configuration, leakage of an electric current from each of the plurality of solid electrolyte fuel cells toward the fixing member can be inhibited, even if a metallic fixing member is used. As a result, short circuit between the electrodes can be avoided.

(17) In a seventeenth aspect of the present invention, a pressed portion between the fixing member and the stacked body is sealed in a gas tight manner.

Due to this configuration, gas leakage and the like can be suitably inhibited.

In order to seal the pressed portion in the gas tight manner, for example, a seal member (such as a metallic gasket, a mica sheet, and so on) may be disposed between an end surface of the stacked body in the pressing direction and an end surface of the insulating member facing the end surface of the stacked body.

(18) In an eighteenth aspect of the present invention, thermally-resistant alloy is used as a material for the fixing member.

This aspect of the present invention gives an example of the material for the fixing member.

The above-described solid electrolyte has ion conductivity which enables one part of either fuel gas, introduced to the fuel electrode when the cells are operated, or oxidant gas, introduced to the air electrode, to be moved as ions. The ions may be, for example, oxygen ions, hydrogen ions, and so on. Moreover, the fuel electrode contacts with fuel gas, which works as a reducing agent, and serves as an anode in the cell. The air electrode contacts with oxidant gas, which becomes oxidant, and serves as a cathode in the cell.

Examples of the material for the solid electrolyte are $ZrO_2$ ceramic, $LaGaO_3$ ceramic, $BaCeO_3$ ceramic, $SrCeO_3$ ceramic, $SrZrO_3$ ceramic, $CaZrO_3$ ceramic, and so on.

Examples of the material for the fuel electrode are a mixture of metal, such as Ni, Fe, and so on, and at least one kind of ceramic, such as $ZrO_2$ ceramic, in which zirconium and the like is stabilized by at least one kind of rare-earth elements, such as Sc, Y, and so on, and $CeO_2$ ceramic. Moreover, metals, such as Pt, Au, Ag, Pd, Ir, Ru, Rh, Ni, Fe, and so on, may be also used. A single kind of these metals may be used, or alloy of two or more kinds of the metals, may be used. Furthermore, a mixture (including cermet) of these metals and/or alloy and at least one kind of the above-described ceramic may be used. Still furthermore, a mixture of oxide of metals, such as Ni, Fe, and so on, and at least one kind of the above-described ceramic may be used.

Examples of the material for the air electrode are metals of various kinds, metallic oxide, metallic multiple oxide, and so on. Examples of the metals are Pt, Au, Ag, Pd, Ir, Ru, Rh and so on, or alloy containing two or more kinds of the above-described metals. Furthermore, examples of the metallic oxide are oxide of La, Sr, Ce, Co, Mn, Fe and so on ($La_2O_3$, SrO, $Ce_2O_3$, $Co_2O_3$, $MnO_2$, FeO, and so on). Still furthermore, examples of the multiple oxide are multiple oxide containing at least La, Pr, Sm, Sr, Ba, Co, Fe, Mn, and so on ($La_{1-x}Sr_xCoO_3$ multiple oxide, $La_{1-x}Sr_xFeO_3$ multiple oxide, $La_{1-x}Sr_xCo_{1-y}Fe_yO_3$ multiple oxide, $La_{1-x}Sr_xMnO_3$ multiple oxide, $Pr_{1-x}Ba_xCoO_3$ multiple oxide, $Sm_{1-x}Sr_xCoO_3$ multiple oxide, and so on).

As the materials for the fixing member and the engagement member, materials excelling in heat resistance, chemical stability, strength, and so on may be used. Examples of such materials are ceramic materials, such as alumina, zirconia and so on, and metallic materials, such as stainless steel, thermally-resistant alloy, such as nickel-based alloy, chrome-based alloy, and so on.

Specifically, ferritic stainless steel, martensitic stainless steel, and austenitic stainless steel may be used for the stainless steel. Examples of the ferritic stainless steel are ferritic stainless steels SUS 430, SUS 434, SUS 405, and so on. Examples of the martensitic stainless steel are martensitic stainless steels SUS 403, SUS 410, SUS 431, and so on. Examples of the austenitic stainless steel are austenitic stainless steels SUS 201, SUS 301, SUS 305, and so on. Examples of the nickel-based alloy are Inconel 600, Inconel 718, Incoloy 802, and so on. Examples of the chrome-based alloy are Ducrlloy CRF ($94Cr5Fe1Y_2O_3$) and so on.

As the material forming the frame portion, the metallic materials or the ceramic materials used for the above-described fixing member may be employed. However, the thermal expansion coefficient of the material used for the fixing member is preferably smaller than the thermal expansion coefficient of the material used for the frame portion.

If electric power generation is performed by using a solid electrolyte fuel cell, fuel gas is introduced in a fuel electrode side, and oxidant gas is introduced in an air electrode side.

Examples of the fuel gas are hydrogen, hydrocarbon which works as a reducing agent, mixed gas made of hydrogen and hydrocarbon, fuel gas made by feeding the above-mentioned types of gas through water at a predetermined temperature so as to moisturize the gas, fuel gas made with water vapor mixed with the above-described types of gas, and so on. The hydrocarbon is not limited to a particular kind, and may be, for example, natural gas, naphtha, coal gasification gas, and so on. Hydrogen is preferable for the fuel gas. Only one kind of fuel gas may be used, or two or more kinds of fuel gas may be used together. The fuel gas may contain inert gas, such as nitrogen, argon and so on, in an amount equal to or smaller than 50 percent by volume.

Examples of the oxidant gas are mixed gas, made of oxygen and other gas, and so on. Moreover, the mixed gas may contain inert gas, such as nitrogen, argon and so on, in an amount equal to or smaller than 80 percent by volume. Atmospheric air (containing nitrogen approximately 80 percent by volume) is preferably used, because atmospheric air is safer and less expensive than any other oxidant gas described above.

BRIEF DESCRIPTION OF THE DRAWINGS

FIGS. 7A-7E are explanatory views illustrating a procedure for producing the bolt;

EXPLANATION OF REFERENTIAL NUMERALS

Figure 1:
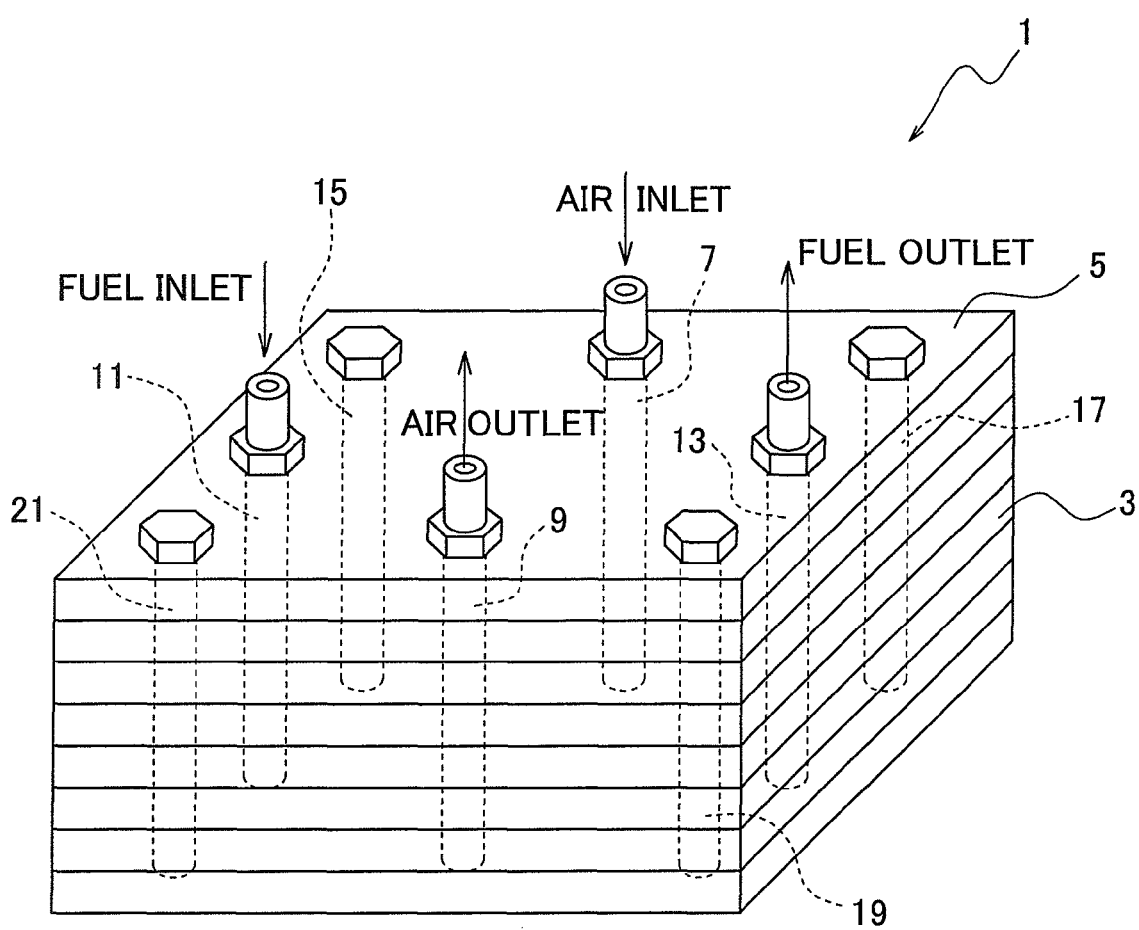
FIG. 1 is a perspective view showing a solid electrolyte fuel cell stack according to a first embodiment.

1 . . . solid electrolyte fuel cell stack
3 . . . solid electrolyte fuel cell
5, 113, 133 . . . stacked body
7, 9, 11, 13, 15, 17, 19, 21, 101, 121, 141, 161 . . . fixing member (bolt)
23 . . . fuel gas flow path
25 . . . fuel electrode
27 . . . solid electrolyte
29 . . . air electrode
33, 39 . . . interconnector
50, 51, 103, 123, 157, 171 . . . engagement member (nut)
52 . . . press-fixing portion
53, 73, 75, 81, 163 . . . center hole (gas flow path in the axial direction)
55, 165 . . . lateral hole
56, 168 . . . internal gas flow path
57, 115, 131, 149, 175 . . . through hole
59, 115, 135, 145, 149, 177 . . . space
60, 117 . . . gas flow path
107, 127, 159 . . . groove
143 . . . cylinder

DETAILED DESCRIPTION OF PREFERRED EMBODIMENTS OF THE INVENTION

The following describes preferred examples (embodiments) of the present invention, that is, embodiments of a solid electrolyte fuel cell stack.

Embodiment 1 a) Firstly, the structure of the solid electrolyte fuel cell stack will be described.

Figure 2:
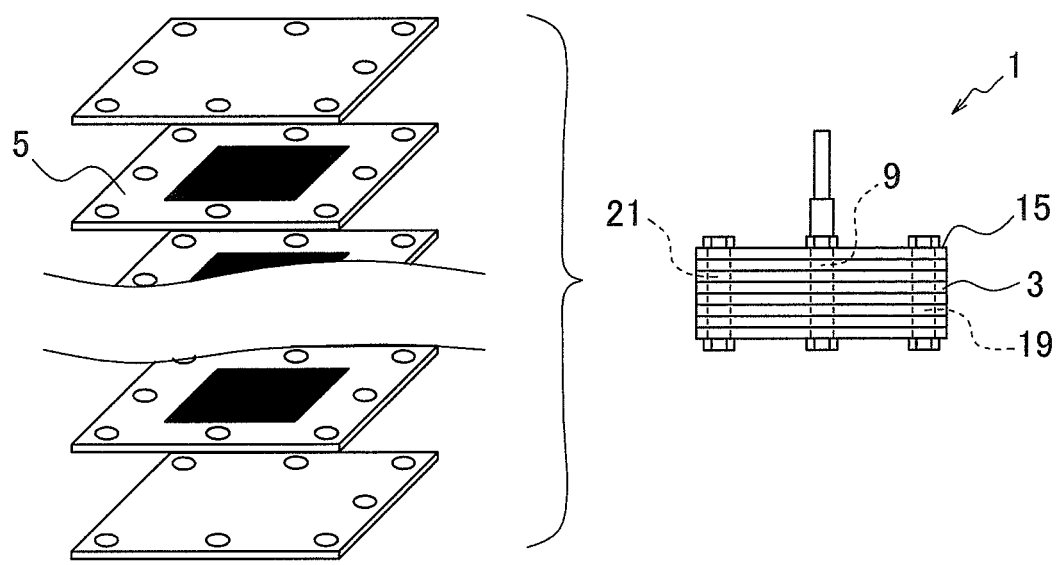
FIG. 2 is an explanatory view showing a disassembled state of the solid electrolyte fuel cell stack, and a state of the stack observed from the front side.

As shown in FIGS. 1 and 2, a solid electrolyte fuel cell stack 1 according to the present embodiment is an apparatus that performs electric power generation when fuel gas (for example, hydrogen) and oxidant gas (for example, atmospheric air (particularly, oxygen contained in the air)) are supplied.

The solid electrolyte fuel cell stack 1 includes a stacked body (stack body) 5 and bolts (fixing members) 7-21. In the stacked body 5, a plurality (for example, eight) of solid electrolyte fuel cells 3 is disposed in a stacked manner. The bolts 7-21 are disposed in the peripheral of the stacked body 5, and penetrate the stacked body 5 in the stacking direction.

Figure 3:
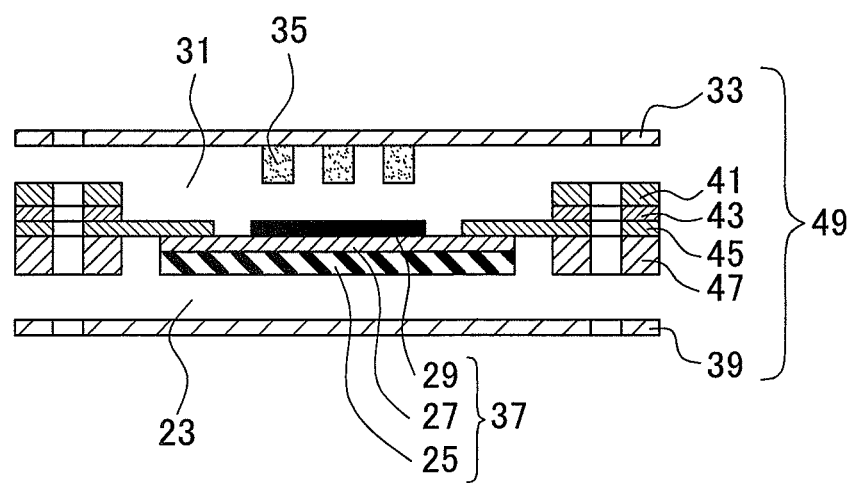
FIG. 3 is an explanatory view showing a disassembled state of the solid electrolyte fuel cell.

As shown in a disassembled manner in FIG. 3, the solid electrolyte fuel cell 3 is a cell of so-called fuel electrode supporting membrane type. In the side where a fuel gas flow path 23 is provided, a fuel electrode (anode) 25 is disposed. On the surface of the fuel electrode 25, which is the upper surface in the drawing, a solid electrolyte 27 is formed in a film manner. On the surface of the solid electrolyte 27, which is the surface positioned in the side where an air flow path 31 is provided, an air electrode (cathode) 29 is formed.

Between the air electrode 29 and a metallic interconnector (a plate that keeps conduction between the cells 3, and blocks a passage of gas) 33 disposed above the air electrode 29, power collectors 35 (which is made of, for example, LSCF, LSM, and the like that are similar to the air electrode 29) are disposed so as to keep the conduction. It is to be noted that the fuel electrode 25, the solid electrolyte 27, and the air electrode 29 that actually perform electric power generation will be referred to altogether as a cell body 37 hereinafter.

Figure 4A:
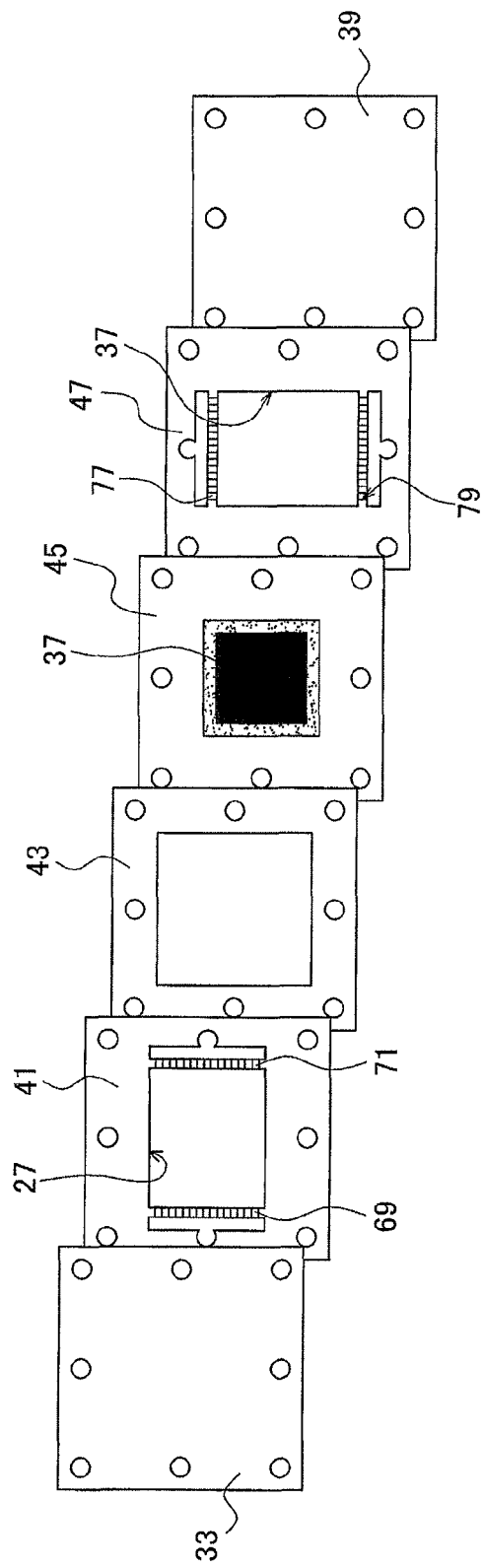
FIG. 4A is an explanatory view showing a disassembled state of the solid electrolyte fuel cell.
Figure 4B:
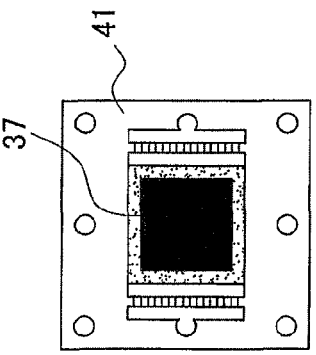
FIG. 4B is a planar view showing a state wherein a substantial part of the cell is assembled.

More specifically, as shown in FIG. 4A in a disassembled manner, the solid electrolyte fuel cell 3 includes a pair of (upper and lower) metallic interconnectors 33, 39, a metallic air electrode frame 41, a ceramic insulating frame 43, a metallic separator 45, and a metallic fuel electrode frame 47. The air electrode frame 41 is disposed in the side where the air flow path 31 is provided. The separator 45 is disposed so as to be connected to the cell body 37, and blocks the passage of gas. The fuel electrode frame 47 is disposed in the side where the fuel gas flow path 23 is provided. FIG. 4B shows a state in which the interconnectors 33, 39 are removed.

The air electrode frame 41, the insulating frame 43, (an outer peripheral portion of) the separator 45, the fuel electrode frame 47, and (outer peripheral portions of) the interconnectors 33, 39 constitute a frame portion 49 of the solid electrolyte fuel cell 3, through which the bolts 7-21 penetrate.

It is to be noted that, since an interconnector is shared between adjacent solid electrolyte fuel cells 3, only one interconnector is provided to cells, except for the solid electrolyte fuel cells 3 disposed in the upper end and the lower end.

The above-described bolts 7-21 are members used for pressing the stacked body 5 in the stacking direction, and restraining the solid electrolyte fuel cells 3. Two types of bolts 7-21 are used due to the structures of the bolts.

That is, as shown in FIG. 1, there are first bolts 15-21 and second bolts 7-13. The first bolts 15-21 are used so as to simply press the solid electrolyte fuel cells 3. The second bolts 7-13 provided, inside thereof, with gas flow paths, through which fuel gas or air flows. The number of the second bolts 7-13 to be used can be suitably determined depending on the rating and the like of the solid electrolyte fuel cell stack 1.

Among the second bolts 7-13, there are bolts 7, 9 for air provided with flow paths for air, and bolts 11, 13 for fuel provided with flow paths for fuel gas. The number of the second bolts 7-13 to be used can be suitably determined depending on the structure, rating, and the like of the solid electrolyte fuel cell stack 1. For example, in a case wherein the flow volume of air is three times as much as the flow volume of fuel gas, four bolts (for both inlets and outlets) can be used for the bolts 7,9 for air, and two bolts (for both an inlet and an outlet) can be used for the bolts 11, 13 for fuel.

It is to be noted that, since the bolts 7, 9 for air and the bolts 11, 13 for fuel gas have identical structures, the structures thereof will be described in the following with reference to, for example, the bolt 7 for air.

Figure 5:
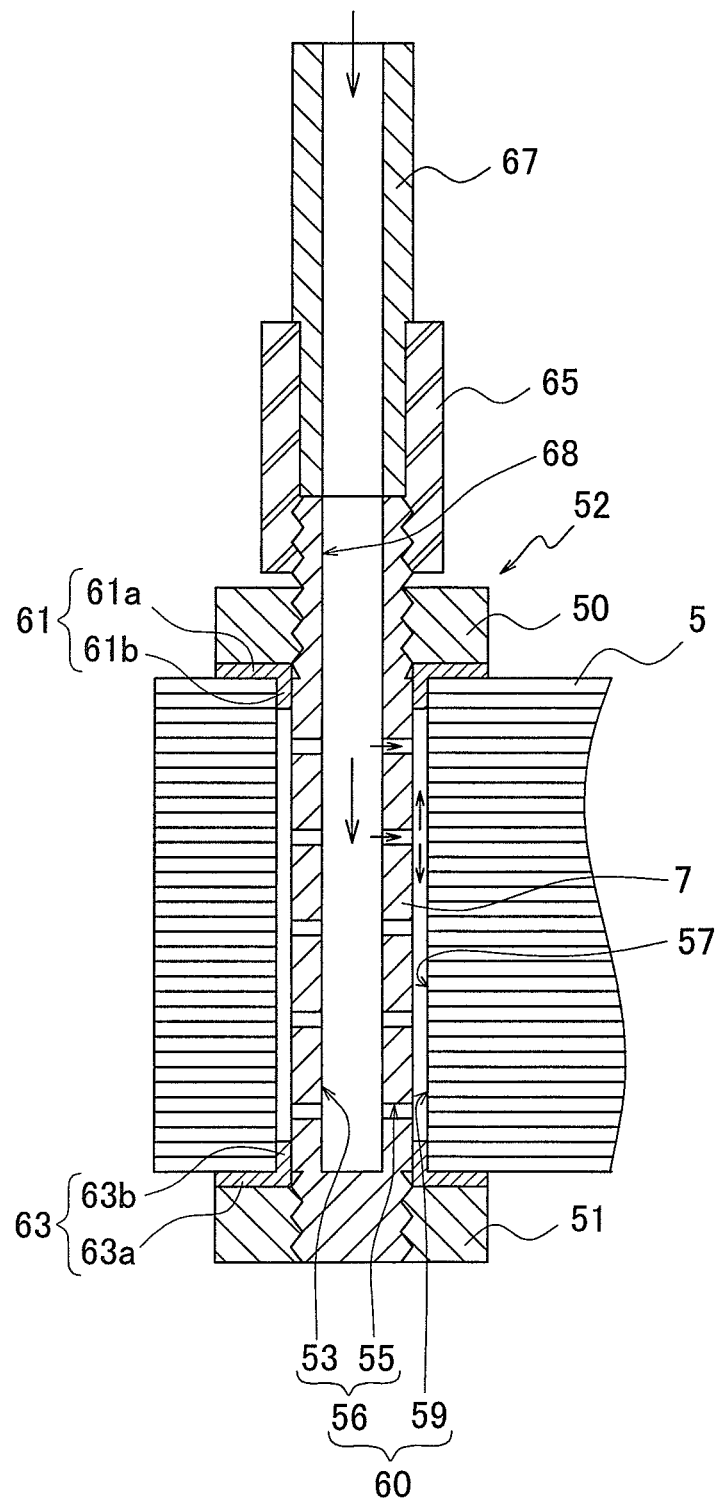
FIG. 5 is an explanatory view showing a bolt in section and a state of use of the bolt.

As shown in FIG. 5, the bolt 7 for air is a long columnar bolt having a hollow. To both of an upper and a lower end of the bolt 7, hexagonal nuts (engagement members) 50, 51 are threadably engaged. The bolt 7 and nuts 50, 51 constitute a press-fixing portion 52.

In the shaft center of the bolt 7, a center hole (a gas flow path in the axial direction) 53 having a bottom is provided so as to extend approximately up to the position of the top surface of the nut 51 disposed in the lower side of the drawing. A plurality of lateral holes 55 are formed so as to extend from the center hole 53 in the radial direction (in the left-to-right direction in the drawing).

The bolt 7 is inserted through a through hole 57 provided in the vicinity of the outer peripheral of the stacked body 5 (in the stacking direction). Between the outer peripheral surface of the bolt 7 and the inner peripheral surface of the through hole 57, a cylindrical space (a gas flow path in the outer peripheral side) 59 is formed, which is to be used as a gas flow path. The center hole 53 and the lateral holes 55 constitute an internal gas flow path 56. The internal gas flow path 56 and the space 59 constitute a gas flow path 60 inside of the through hole 57.

In the up-and-down direction of the bolt 7, insulating spacers (insulating rings) 61, 63, made of, for example, alumina into a flange shape, are externally fitted between the respective nuts 50, 51 and the stacked body 5. Due to flange portions 61a, 63a of the insulating spacers 61, 63 being interposed between the respective nuts 50, 51 and the stacked body 5, a clearance is maintained between the bolt 7 and the stacked body 5. Moreover, due to cylinder portions 61b, 63b of the insulating spacers 61, 63 being disposed between the nuts 50, 51 and the stacked body 5, the above-described space 59 is maintained.

A joint 65 is threadably engaged with the upper end of the bolt 7. To the joint 65, a gas pipe 67 for gas supply (or for discharge) is attached.

The upper portion of the center hole 53 (an externally communicated gas flow path 68) is communicated with the gas pipe 67. Therefore, the inside of the gas pipe 67 and the space 59 provided inside of the through hole 57 are communicated so as to allow the passage of gas through the externally communicated gas flow path 68, the center hole 53, and the lateral holes 55.

b) The following describes the passage of gas in the solid electrolyte fuel cell stack 1.

(1) Passage of Air

As shown in FIG. 5, air supplied from the upside of the bolt 7 for air is introduced into the center hole 53, formed in the shaft center of the bolt 7, and supplied to the space 59 through the respective lateral holes 55.

Figure 6A:
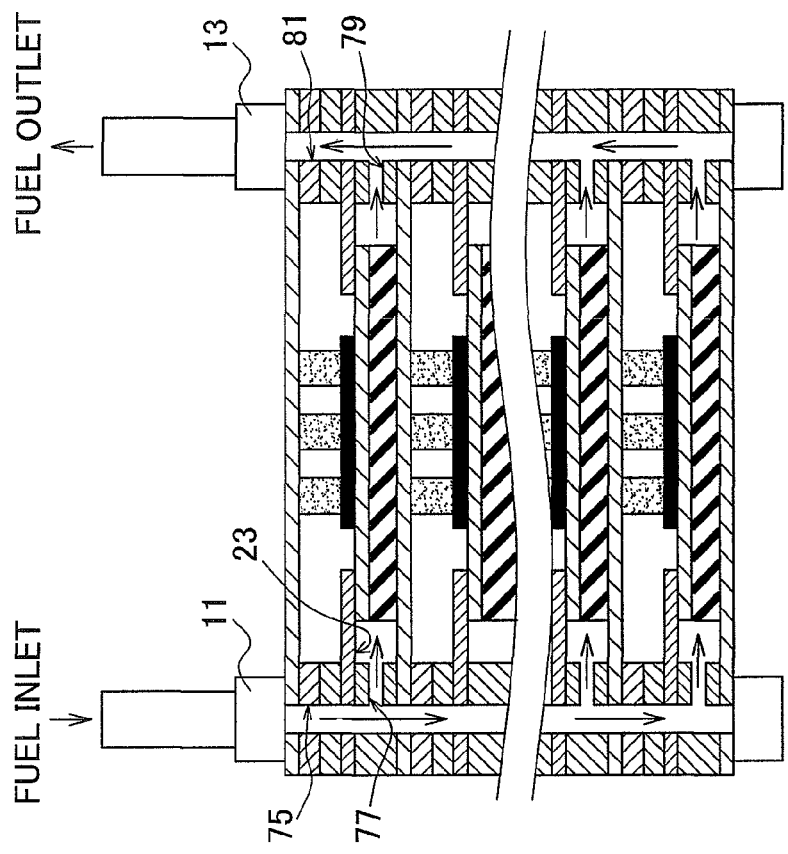
FIG. 6A is an explanatory view showing a passage of air in the stack.

The air supplied to the space 59 is, as shown in FIG. 6A, introduced toward the air flow path 31, provided inside of each solid electrolyte fuel cell 3, through a cell communication portion 69 in the air introduction side (see FIG. 4A) provided in the lateral portion of the cell 3. It is to be noted that, in FIG. 6A, the lateral holes 55 and the space 59 are not shown due to the size of the drawing (the same applies hereinafter).

Subsequently, the air inside of the air flow path 31, provided inside of the cell, is discharged into a center hole 73 of another bolt 9 for air (for discharge) from a cell communication path 71 in the air discharge side (see FIG. 4A) through the lateral holes and the space, which are described above but not shown in the drawing. Then, the air is discharged from the upside of the center hole 73 to the outside of the stack.

(2) Passage of Fuel

Figure 6B:
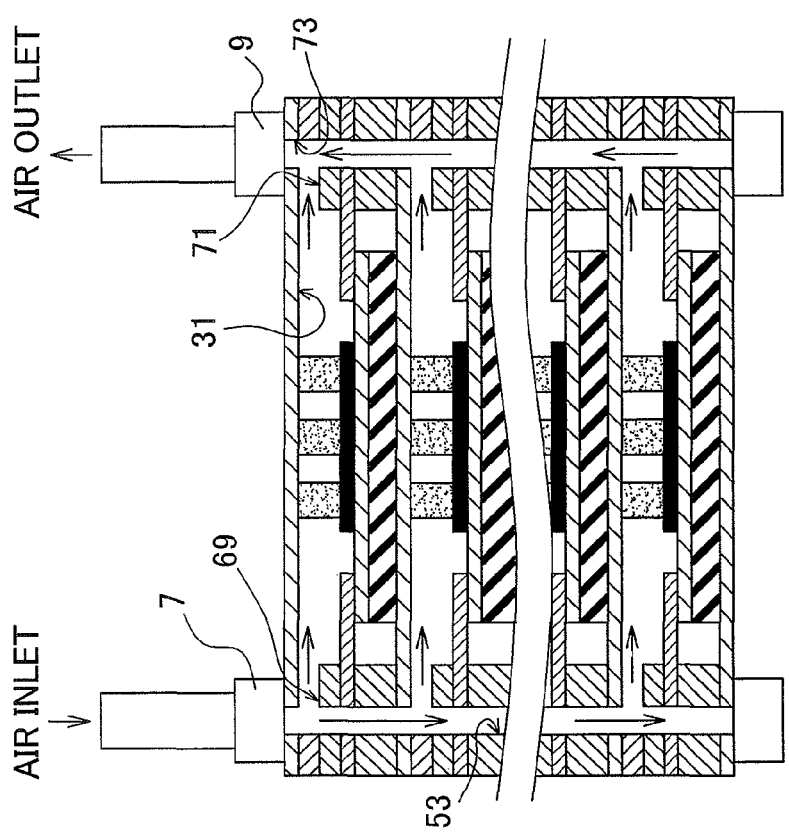
FIG. 6B is an explanatory view showing a passage of fuel gas in the stack.

As shown in FIG. 6B, fuel gas supplied from the upside of the bolt 11 for fuel is introduced into a center hole 75 formed in the shaft center of the bolt 11, and supplied through respective lateral holes (not shown) to a space (not shown).

The fuel gas supplied to the space is introduced toward a fuel flow path 23, provided in each solid electrolyte fuel cell 3, through a cell communication portion 77 in the fuel introduction side (see FIG. 4B) provided in the lateral portion of the cell 3.

Subsequently, the fuel gas inside of the fuel flow path 23, provided inside of the cell, is discharged into a center hole 81 of another bolt 13 for fuel (for discharge) from a cell communication path 79 in the fuel discharge side (see FIG. 4B) through the lateral holes and the space, which are not shown in the drawing. Then, the fuel is discharged from the upside of the center hole 81 to the outside of the stack.

c) The following briefly describes a method for producing the solid electrolyte fuel cell stack 1.

Firstly, a plate member (SUS 430), for example, is punched out so as to produce the interconnectors 33, 39, the air electrode frame 41, the fuel electrode frame 47, and the separator 45.

In accordance with a common method, a green sheet, mainly made of alumina, is formed into a predetermined shape, and calcined so as to produce the insulating frame 43.

The cell body 37 of the solid electrolyte fuel cell 3 is produced in accordance with a common method. Specifically, the materials of the solid electrolyte 27 are printed on the green sheet to be used as the fuel electrode 25, and the materials of the air electrode 29 are printed over the materials of the solid electrolyte 27. Then, the cell body 37 is calcined, and secured to the separator 45 by brazing.

In addition, the bolts 7-13 for air and for fuel are produced in accordance with the procedure described below.

Specifically, as shown in FIG. 7A, spot facing is performed with respect to a round bar (SUS 430) 83 (for example, the bolt 7 for air), for example, having a size of diameter: 15 mm×length: 120 mm, in order to make the center hole 53 having a size of inner diameter: 9 mm×depth: 100 mm (see FIG. 7B).

Subsequently, both of the top end and the bottom end of the outer peripheral of the round bar 83 are threaded so as to make a thread portion 85 having a length of 30 mm and a thread portion 87 having a length of 20 mm (see FIG. 7C).

Then, along the axial direction of the round bar 83, the plurality of lateral holes 55, having a diameter of 2 mm, is formed in the radial direction so as to have a uniform interval therebetween, and so that the center hole 53 and the outer peripheral side of the round bar 83 are communicated. As a result, the bolts 7-13 are completed (see FIGS. 7D, 7E).

Subsequently, the above-described interconnectors 33, 39, the air electrode frame 41, the fuel electrode frame 47, the separator 45 to which the cell body 37 is attached by brazing, the power collector 35, and so on are integrated so as to assemble each of the solid electrolyte fuel cell 3. The solid electrolyte fuel cells 3 are stacked so as to form the stacked body 5.

Then, the bolts 7-21 are inserted into the through holes 57 of the stacked body 5. From both ends of each of the bolts 7-21, the insulating spacers 61, 63 are fitted, and the nuts 50, 51 are threadably engaged with the both ends of each of the bolts 7-21.

Subsequently, the nuts 50, 51 are fastened so as to press and secure the stacked body 5 in an integrated manner. As a result, the solid electrolyte fuel cell stack 1 is completed.

It is to be noted that a normal bolt having a head on one end so that a nut is to be secured only on one end of the bolt may be used for the bolts 7, 9 for air, the bolts 11,13 for fuel, and the bolt 15-21 used only for securing.

c) The flowing describes the effect of the present embodiment.

In the present embodiment, hollow bolts 7-13, respectively having center holes 53 to be used as a gas flow path, are inserted through the through holes 57, provided to the stacked body 5 of the solid electrolyte fuel cells 3, and threadably engaged with the nuts 50, 51 so as to press and secure the stacked body 5 of the solid electrolyte fuel cells 3.

Consequently, unlike in a conventional stack, an additional member, other than the gas flow path, is not necessary to be disposed for restraining the stack 1. Therefore, the planar size of the cell 3 (specifically, frames and so on) can be small, and the structure thereof can be simplified. As a result, the volume energy density, and, consequently, the weight energy density can be increased.

In other words, according to the present embodiment, the unnecessary portion that does not contribute to electric power generation can be reduced as small as possible, and the necessary portion required for maintaining the sealing property can be very flexibly designed. Therefore, a highly reliable and highly efficient solid electrolyte fuel cell stack 1 can be achieved.

Moreover, in the present embodiment, if the materials of the bolts 7-13 and the stacked body 5 are selected such that the degree of thermal expansion (for example, thermal expansion coefficient) of the bolts 7-13 becomes smaller than the degree of thermal expansion of the stacked body 5, the following effect can be achieved: the pressing force hardly becomes decreased, even when the temperature of the solid electrolyte fuel cell stack 1 increases to a high temperature, since the degree of stretching of the bolts 7-13 is smaller than the degree of stretching of the stacked body 5.

Furthermore, due to the insulating spacers 61, 63 being disposed between the respective bolts 7-13 and the stacked body 5, leakage of an electric current from the solid electrolyte fuel cell 3 toward the bolts 7-13 can be inhibited, even if metallic bolts 7-13 are used.

Additionally, since the space 59, communicated with the gas flow path, is formed between the bolts 7-13 and the stacked body 5 due to the insulating spacers 61, 63, the gas flow path inside of the bolts 7-13 and the gas flow path inside of the respective solid electrolyte fuel cell 3 can be communicated through the space 59. Therefore, a path for gas inflow and outflow can be easily acquired.

Embodiment 2

The following describes Embodiment 2. However, the same description as in the above-described Embodiment 1 will not be repeated.

In the present embodiment, grooves to be used as a gas flow path are provided to the outer surface of a fixing member. There are bolts for air and bolts for fuel as fixing members. However, since these bolts are configured in the same manner, only one bolt for air will be described here as an example (the same applies hereinafter).

Figure 8A:
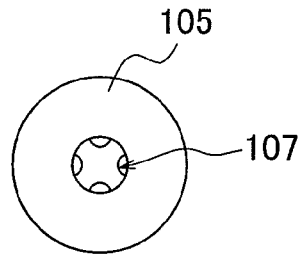
FIG. 8A is a planar view illustrating a connection member of a second embodiment.
Figure 8B:
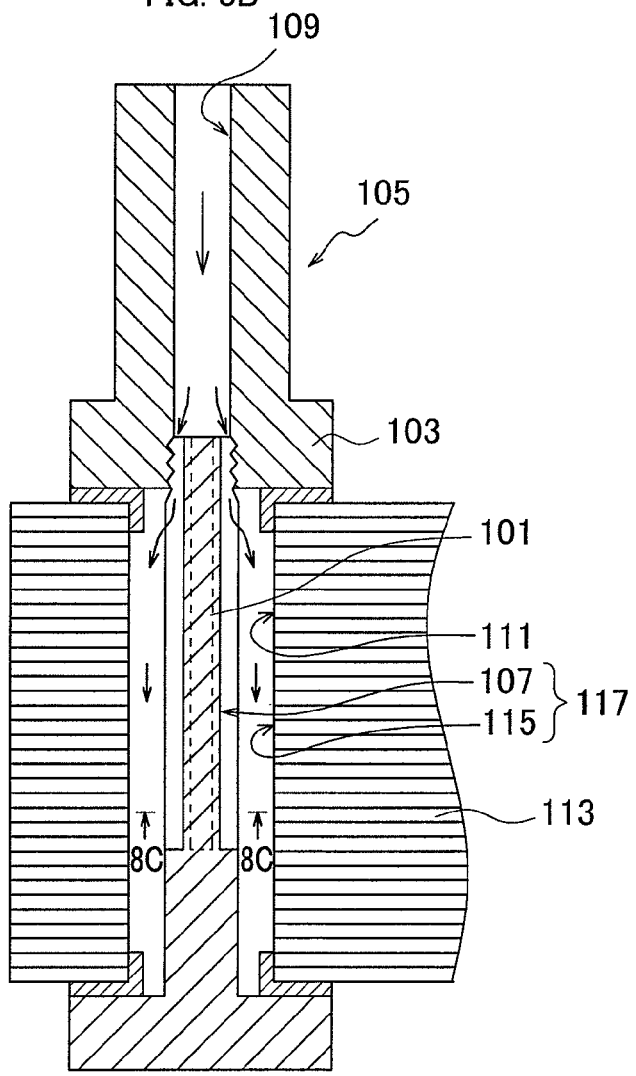
FIG. 8B is an explanatory view showing a bolt in section and a state of use of the bolt.
Figure 8C:
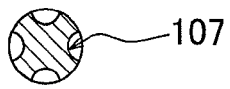
FIG. 8C is a sectional view showing a cross section taken along 8C-8C in FIG. 8B.

As shown in FIG. 8B, in the present embodiment, a bolt 101 for air is a long columnar bolt. The top end of the bolt 101 is threadably engaged with a connection member (having a hexagon nut 103 at one end (the bottom end)) 105.

On the outer peripheral surface of the bolt 101, four grooves 107 are formed along the axial direction of the bolt so as to have an interval of 90° between adjacent grooves. The top end of each groove 107 is communicated with a gas hole 109 penetrating the connection member 105 in the axial direction. The lower portions of the grooves 107 are communicated with a space 115 formed inside of a though hole 111, in which the bolt 101 is inserted, that is, formed between the outer peripheral surface of the bolt 101 and the inner peripheral surface of the through hole 111 penetrating the stacked body 113 in the stacking direction.

Therefore, as shown by the arrows in the drawing, air supplied from the gas hole 109 of the connection member 105 is introduced into the space 115, provided inside of the through hole 111, through the grooves 107 provided to the outer surface of the bolt 101. By the grooves 107 and the space 115, a gas flow path 117 is constituted inside of the through hole 111.

The same effect as in Embodiment 1 described above can be achieved in the present embodiment. Moreover, since what is required is simply to form the grooves 107 on the outer surface of the bolt 101, there is an advantage in that the production is easy.

It is to be noted that, for discharging air, the direction of air flow becomes opposite to the direction of inflow, and that fuel gas flows in the same direction as air flows.

Embodiment 3

The following describes Embodiment 3. However, the same description as in the above-described Embodiment 1 will not be repeated.

In the present embodiment, a groove to be used as a gas flow path is provided to an engagement member, which is engaged with a fixing member.

Figure 9A:
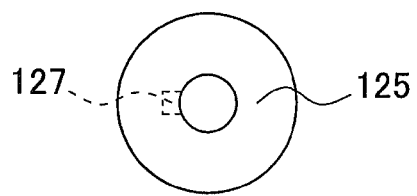
FIG. 9A is a planar view illustrating a connection member of a third embodiment.
Figure 9B:
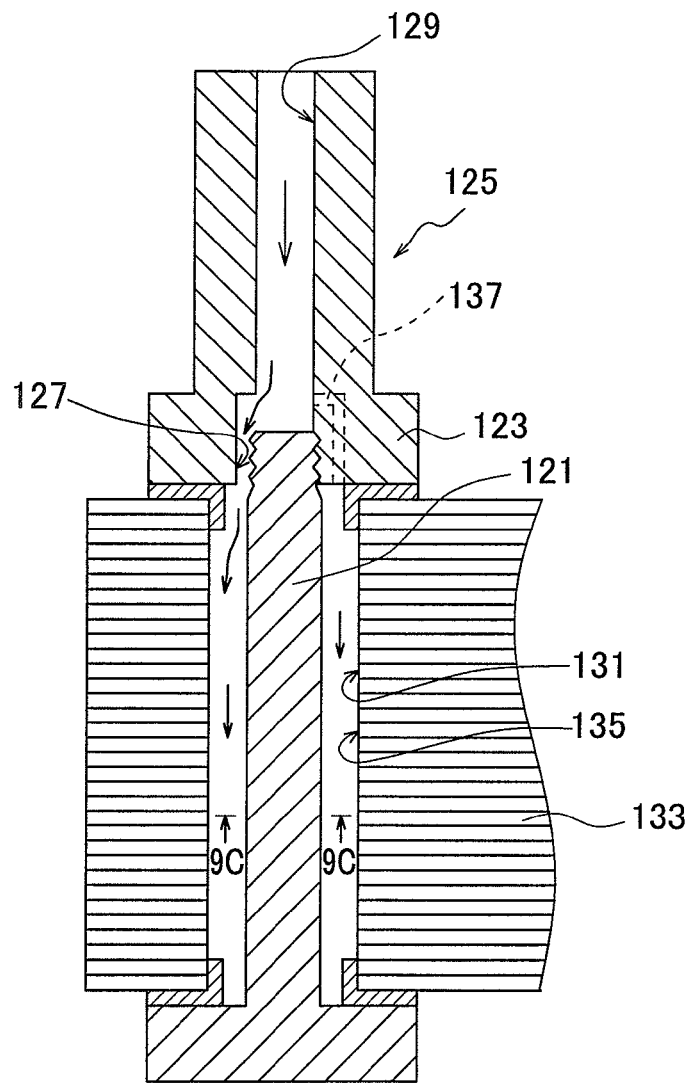
FIG. 9B is an explanatory view showing a bolt in section and a state of use of the bolt.
Figure 9C:
FIG. 9C is a sectional view showing a cross section taken along 9C-9C in FIG. 9B.

As shown in FIG. 9B, in the present embodiment, a bolt 121 for air is a long columnar bolt. To the top end of the bolt 121, a connection member (having a hexagon nut 123 at one end (bottom end) thereof) 125 is threadably engaged.

On the inner peripheral surface of the nut 123, one groove 127 is formed (alternatively, a plurality of grooves may be formed) along the axial direction of the nut 123. The top end of the groove 127 is communicated with a gas hole 129 of a connection member 125. The bottom end of the groove 127 is communicated with a through hole 131 in which the bolt 121 is inserted, that is, a space 135 formed between the outer peripheral surface of the bolt 121 and the inner peripheral surface of the through hole 131 penetrating a stacked body 133.

Therefore, as shown by the arrows in the drawing, air supplied from the gas hole 129 of the connection member 125 is introduced into the space 135 inside of the through hole 131 via the groove 127 provided inside of the nut 123.

The same effect as in Embodiment 1 described above can be achieved in the present embodiment. Moreover, since what is required is simply to form the groove 127 inside of the nut 123, there is an advantage in that the production is easy.

Alternatively, as another example, a communication hole 137 may be formed, as shown by the dashed line in the drawing, such that the communication hole 137 penetrates inside of the nut 123, and the gas hole 129 of the connection member 125 and the space 135, provided inside of the through hole 131, are communicated.

It is to be noted that, when air is discharged, the direction of air flow becomes opposite to the direction of inflow, and that fuel gas flows in the same direction as air flows.

Embodiment 4

The following describes Embodiment 4. However, the same description as in the above-described Embodiment 3 will not be repeated.

In the present embodiment, Embodiment 3 is further modified wherein a groove to be used as a gas flow path is provided to an engagement member, which is engaged with a fixing member, and a cylinder is disposed so as to be externally fitted with the fixing member.

Figure 10A:
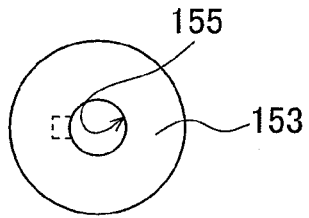
FIG. 10A is a planar view illustrating a connection member of a fourth embodiment.
Figure 10B:
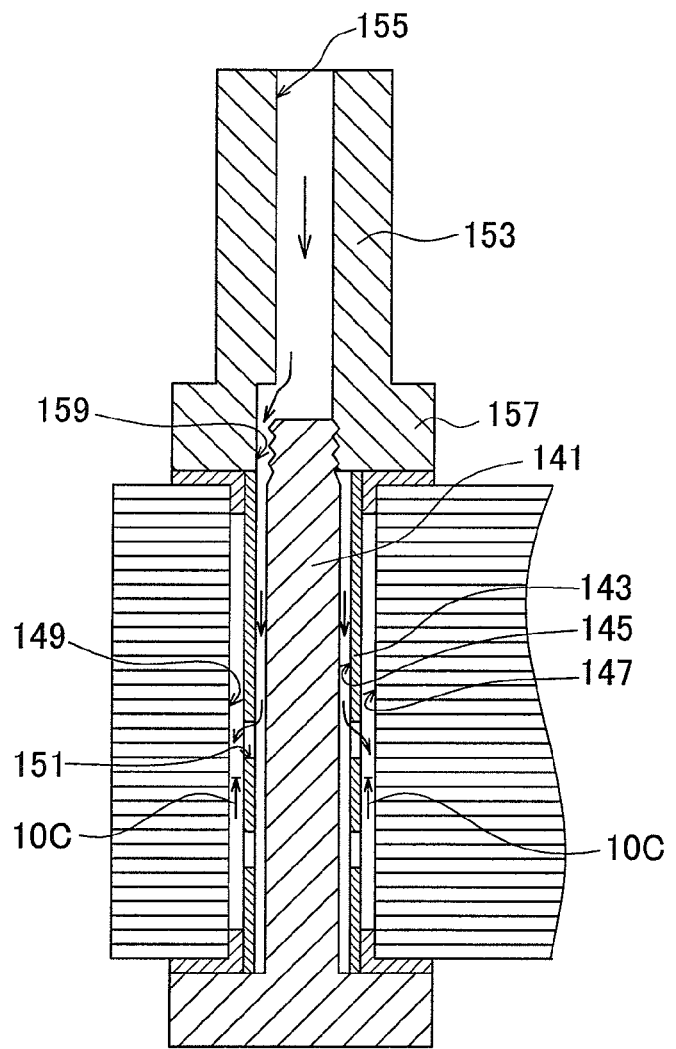
FIG. 10B is an explanatory view showing a bolt in section and a state of use of the bolt.
Figure 10C:
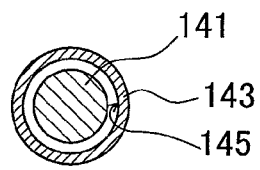
FIG. 10C is a sectional view showing a cross section taken along 10C-10C in FIG. 10B.

As shown in FIG. 10B, in the present embodiment, a cylinder 143 is disposed outside of a bolt 141 for air. A cylindrical space 145 is provided between the bolt 141 and the cylinder 143. Another space 149 is provided between the cylinder 143 and the inner peripheral surface of a through hole 147. Additionally, in a leading end side (in the bottom end side) of the cylinder 143, communication holes 151 are formed such that the inner space 145 and the outer space 149 are communicated.

Therefore, as shown by the arrows in the drawing, air supplied from the gas hole 155 of the connection member 153 is introduced into the space 145 inside of the cylinder 143 via the groove 159, provided inside of the nut 157, and further introduced into the space 149 outside of the cylinder 143 via the communication holes 151 provided in the leading end side of the cylinder 143.

The same effect as in Embodiment 3 described above can be achieved in the present embodiment. Moreover, there is an advantage in that air can be sufficiently supplied toward the leading end side of the bolt 141, since the cylinder 143, provided with the communication holes 151 in the leading end side thereof, is externally fitted with the bolt 141. Furthermore, by adjusting the number, the position, and the size of the communication holes 151, a state of air supply can be adjusted.

It is to be noted that, when air is discharged, the direction of air flow becomes opposite to the direction of inflow, and that fuel gas flows in the same direction as air flows.

Embodiment 5

The following describes Embodiment 5. However, the same description as in the above-described Embodiment 1 will not be repeated.

In the present embodiment, a plurality of members is connected in the axial direction so as to form the fixing member.

Figure 11A:
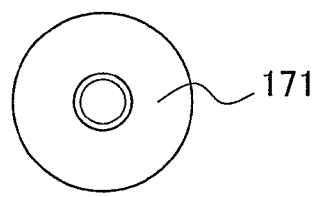
FIG. 11A is a planar view illustrating a connection member of a fifth embodiment.
Figure 11B:
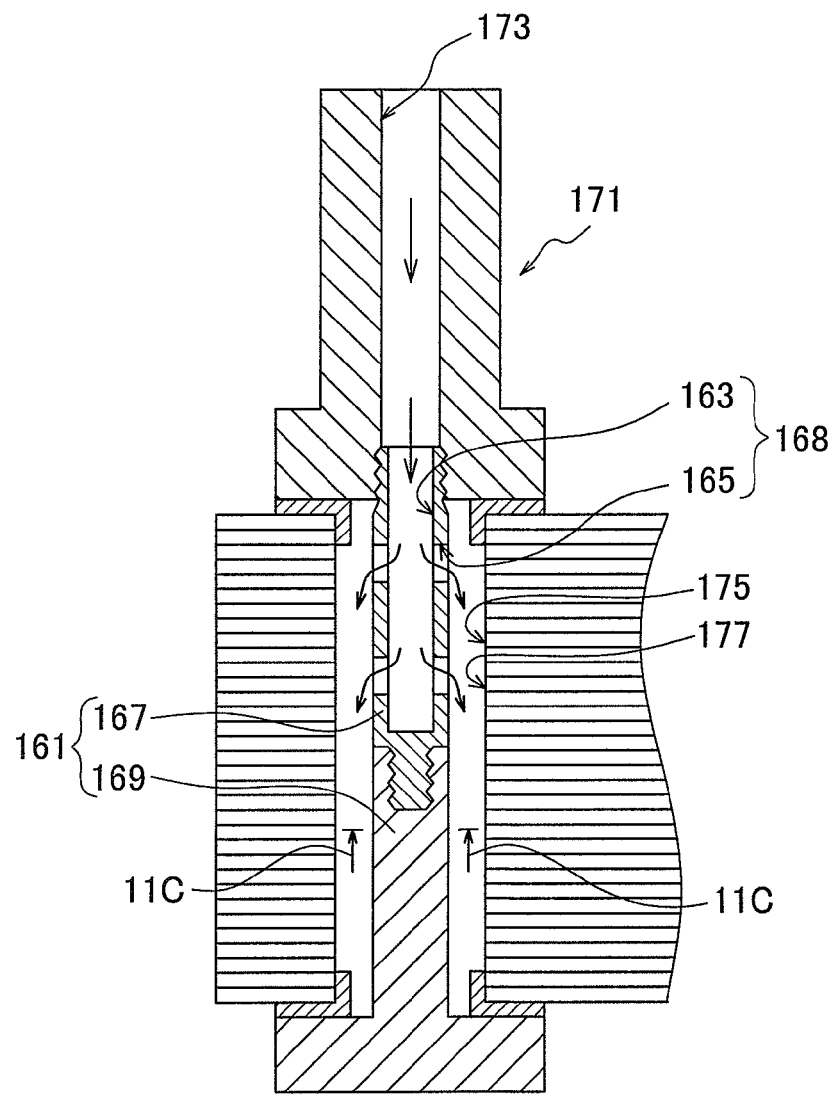
FIG. 11B is an explanatory view showing a bolt in section and a state of use of the bolt.
Figure 11C:
FIG. 11C is a sectional view showing a cross section taken along 11C-11C in FIG. 11B.

As shown in FIG. 11B, in the present embodiment, a bolt 161 for air is a long bolt constituted with two pieces of members connected in the axial direction.

That is, the bolt 161 is constituted with an upper bolt 167 and a lower bolt 169 connected in the center portion of the bolt 161. The upper bolt 167 is provided with a center hole 163 and lateral holes 165 formed in the same manner as in Embodiment 1. The lower bolt 169 has a solid core.

Although the connection is provided by a connection between a male screw and a female screw, the way to make the connection is not limited to this way. Alternatively, for example, both screws may be male screws and threadably connected by using an additional nut disposed outside of the screws.

In the present embodiment, as shown by the arrows in the drawing, air supplied from the gas hole 173 of the connection member 171 is introduced into the space 177 inside of the through hole 175 via the gas hole 163 and the lateral holes 165 of the upper bolt 167. By the gas hole 163 and the lateral holes 165, an internal gas flow path 168 is constituted in the upper bolt 167.

The same effect as in Embodiment 1 described above can be achieved in the present embodiment. Moreover, there is an advantage in that, particularly, processing the center hole 163 of the upper bolt 167 becomes easy, since the bolt 161 can be made by connecting the short upper bolt 167 and the short lower bolt 169.

It is to be noted that, when air is discharged, the direction of air flow becomes opposite to the direction of inflow, and that fuel gas flows in the same direction as air flows.

It should be noted that the present invention is not limited to the above-described embodiments, and can be carried out in various ways without departing from the scope of the present invention.

For example, a sealing member, such as a metal gasket and the like, may be disposed between the insulating spacer and the stacked body (in the position where the spacer and the stacked body face each other). This configuration can further improve the sealing property.

What is claimed is:

1. A solid electrolyte fuel cell stack comprising:
   a plurality of solid electrolyte fuel cells stacked therein, each of the plurality of solid electrolyte fuel cells being provided with a cell body, the cell body including a solid electrolyte, a fuel electrode which contacts with fuel gas, and an air electrode which contacts with oxidant gas;
   a plurality of through holes penetrating a stacked body, formed by the plurality of solid electrolyte fuel cells, in a stacking direction;
   a plurality of press-fixing portions each of which includes a fixing member inserted in one of the plurality of through holes, and presses the stacked body in the stacking direction so as to secure the stacked body;
   a separator to which the cell body is connected and which blocks a passage of gas between a fuel gas flow path and an air flow path,
   wherein the plurality of through holes penetrate an outer peripheral portion of the separator, and securing is achieved by the fixing member inserted in each of the plurality of through holes in the outer peripheral portion of the separator; and
   a gas flow path which is provided inside of at least one of the plurality of through holes in which the fixing member is disposed, so as to either supply gas toward the plurality of solid electrolyte fuel cells, or discharge gas from the plurality of solid electrolyte fuel cells.

2. The solid electrolyte fuel cell stack according to claim 1 wherein the gas flow path is constituted with the fixing member.

3. The solid electrolyte fuel cell stack according to claim 1 wherein the fixing member is provided, inside thereof, with the gas flow path.

4. The solid electrolyte fuel cell stack according to claim 3 wherein the gas flow path, provided inside of the fixing member, includes a gas flow path that communicates inside of respective ones of the plurality of through holes and outside of the stacked body.

5. The solid electrolyte fuel cell stack according to claim 3 wherein a space, communicating with the gas flow path provided inside of the fixing member, is provided between the fixing member and the stacked body.

6. The solid electrolyte fuel cell stack according to claim 3, wherein the fixing member is a long member, and
   wherein the gas flow path, provided inside of the fixing member, includes an axial gas flow path extending in a longitudinal direction of the fixing member, and lateral holes communicating with the axial gas flow path and opened toward an outer periphery of the fixing member.

7. The solid electrolyte fuel cell stack according to claim 3 wherein the fixing member is a hollow bolt.

8. The solid electrolyte fuel cell stack according to claim 1 wherein grooves that communicate inside of respective ones of the plurality of through holes and outside of the stacked body are provided on an outer peripheral surface of the fixing member.

9. The solid electrolyte fuel cell stack according to claim 1 wherein a communication hole that communicates inside of respective ones of the plurality of through holes and outside of the stacked body is provided inside of a member with which the fixing member is engaged.

10. The solid electrolyte fuel cell stack according to claim 1 wherein a groove that communicates inside of respective ones of the plurality of through holes and outside of the stacked body is provided on an inner peripheral surface of a member with which the fixing member is engaged.

11. The solid electrolyte fuel cell stack according to claim 1,
    wherein a cylinder externally fitted with the fixing member is disposed inside of respective ones of the plurality of through holes,
    wherein a gas flow path is provided inside and outside of the cylinder, and
    wherein the cylinder is provided with communication holes that communicate the gas flow path inside and outside of the cylinder.

12. The solid electrolyte fuel cell stack according to claim 1 wherein the fixing member is a long member in which a plurality of members is connected in an axial direction.

13. The solid electrolyte fuel cell stack according to claim 1 wherein each of the plurality of press-fixing portions further includes an engagement member which engages with the fixing member.

14. The solid electrolyte fuel cell stack according to claim 1,
    wherein each of the plurality of solid electrolyte fuel cells comprises a frame portion that encloses the cell body from an outer peripheral side of the cell body in a planar direction, and
    wherein the fixing member penetrates the frame portion.

15. The solid electrolyte fuel cell stack according to claim 1 wherein a degree of thermal expansion of the fixing member is smaller than a degree of thermal expansion of the stacked body pressed by the fixing member.

16. The solid electrolyte fuel cell stack according to claim 1 wherein an insulating member that insulates conduction between the fixing member and the stacked body is disposed between the fixing member and the stacked body.

17. The solid electrolyte fuel cell stack according to claim 1 wherein a pressed portion between the fixing member and the stacked body is sealed in a gas tight manner.

18. The solid electrolyte fuel cell stack according to claim 1 wherein thermally-resistant alloy is used as a material for the fixing member.

* * * * *